Figure 1:
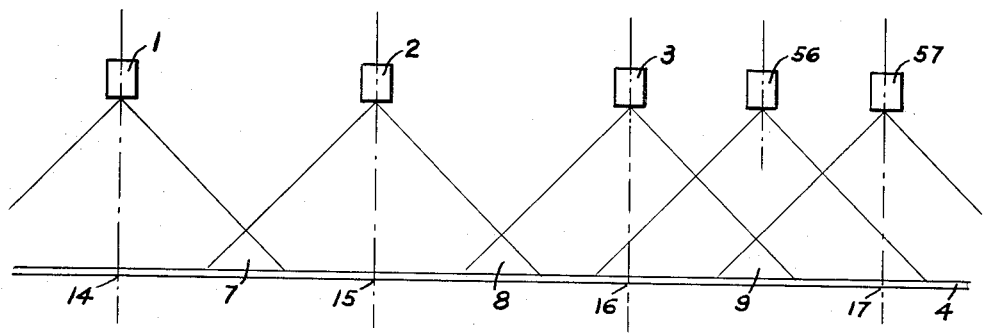

March 13, 1962 E. SHUFTAN 3,024,694
PROJECTION OF COMPOSITE PICTURES
Filed Jan. 7, 1959 2 Sheets-Sheet 1

INVENTOR.
EUGEN SHUFTAN

March 13, 1962  E. SHUFTAN  3,024,694
PROJECTION OF COMPOSITE PICTURES
Filed Jan. 7, 1959  2 Sheets-Sheet 2

INVENTOR.
EUGEN SHUFTAN

United States Patent Office 3,024,694
Patented Mar. 13, 1962

3,024,694
PROJECTION OF COMPOSITE PICTURES
Eugen Shuftan, 115 W. 71st St., New York, N.Y.
Filed Jan. 7, 1959, Ser. No. 785,402
2 Claims. (Cl. 88—16.6)

This invention relates to picture projection and more specifically to the juxtaposition or superimposition of several component pictures on a common screen for simultaneous exposure to one or more photographic, television, or cinematographic cameras, or any other type of producing, reproducing or viewing installation.

One of the objects of the invention is to make transition from one component picture to an adjacent one as smooth and as inconspicuous as possible, at least as far as the picture-producing or reproducing installation is concerned.

Another object of the invention is to arrange the different projectors for the different component pictures with their optical axes directed or reflected more or less directly into the objective of a camera or cameras, and to combine the different picture components for reproduction or transmission with their edges overlapping, and to provide at these overlaps means gradually increasing in light intensity with increasing distance from the optical axis of beam associated therewith.

A further object of the invention is to arrange a number of picture projectors for the different component pictures with their optical axes directed more or less perpendicularly to the back of a semitransparent or background projection screen, and to photograph or televise the composite picture thus obtained, from the front of the screen, if necessary or desired in combination with a live action occurring in front of the screen or in front of the photographic or television camera concerned; the component pictures being projected with their edges overlapping, and the overlaps being varied in intensity with the distance from the optical axis associated therewith, to compensate for the variation in light intensity of the projecting light beam at a varying distance from its optical axis.

A more specific object of the invention is to project several component pictures in directions substantially perpendicular with respect to and onto the rear surface of a back projection screen, the front surface of which is exposed to a photographic or television camera taking the entire composite picture, and to provide substantially identical overlapping picture areas or strips composed of superimposed edge portions of adjacent picture components, and further to provide in the beam areas or strips corresponding to these overlapping picture portions, masks having outlines traversing these overlapping areas or strip at an angle or angles other than zero and 90°, said masking outlines being arranged adjustable in unsharp zones of the corresponding picture projections gradually to reduce the light intensity in a direction from the periphery to the center of each beam, and substantially simultaneously to reduce the overall light intensity of the overlaps, in the first instance to compensate the decrease in light intensity of the projecting beams from the center toward its periphery, and in the second instance to compensate for the overall increase in light intensity due to the superimposition of the pictures in the areas or strips of overlap.

Still another object of the invention is to provide in superimposed beam portions corresponding to substantially identical picture overlaps, at unsharp zones thereof, a mask of zigzag outline traversing these overlaps and gradually increasing in width from a central portion of each overlap to corresponding top and bottom portions thereof to compensate light variations caused by changes in beam intensity in radial directions from the center of each beam toward its periphery.

A further specific object of the invention is to provide a mask having zigzag-shaped outlines consisting of curved portions forming the connection lines of the pattern, said curved portions being curved in substantially similar directions, and gradually, preferably circularly, increasing in elongation from the central portion of minimum width to approximately equal peripheral portions of maximum width.

In a more specific embodiment of the invention the different masks are arranged in substantially vertical array and the different central portions of minimum width, corresponding to overlaps, are arranged along the horizontal axis of the array of picture components, while the mask portions of maximum width are arranged at the top and bottom edges, respectively, of the array of the picture components.

These and other objects of the invention will be more fully described in connection with the drawings attached herein in which FIG. 1 represents schematically an arrangement of picture projectors embodying certain features of the invention.

Figure 2:
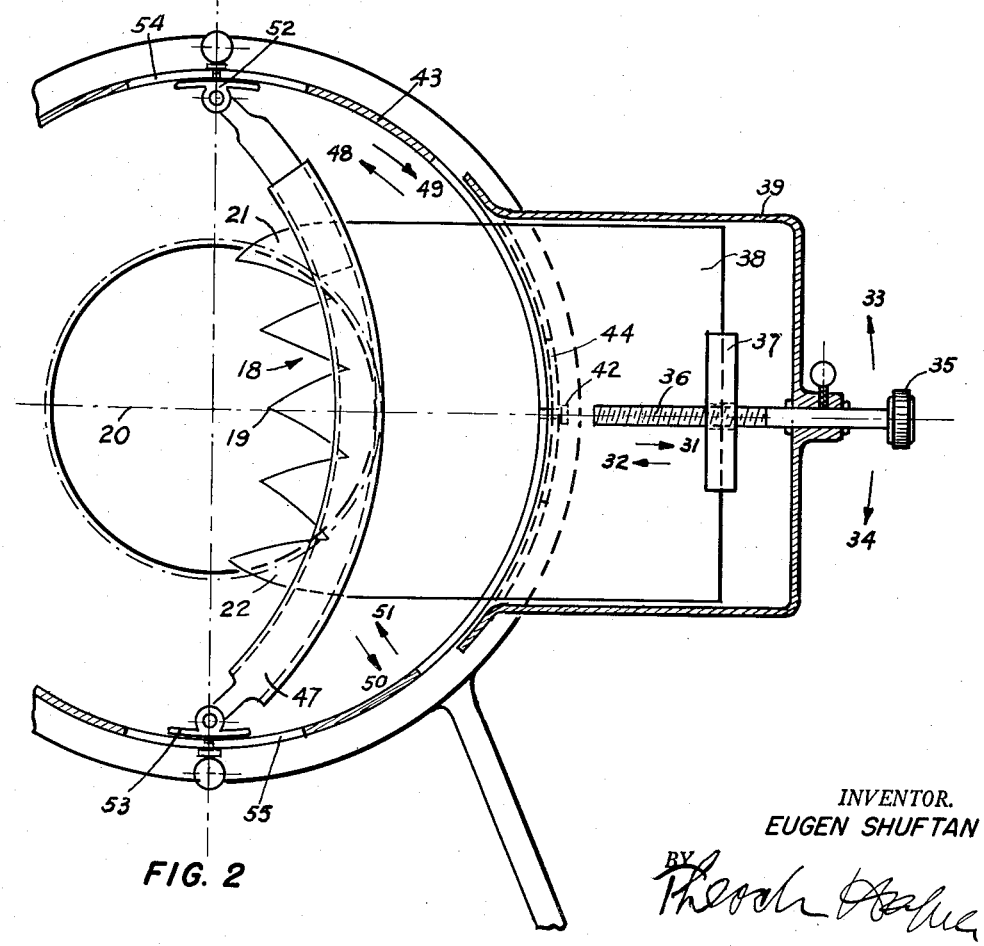
Figure 3:
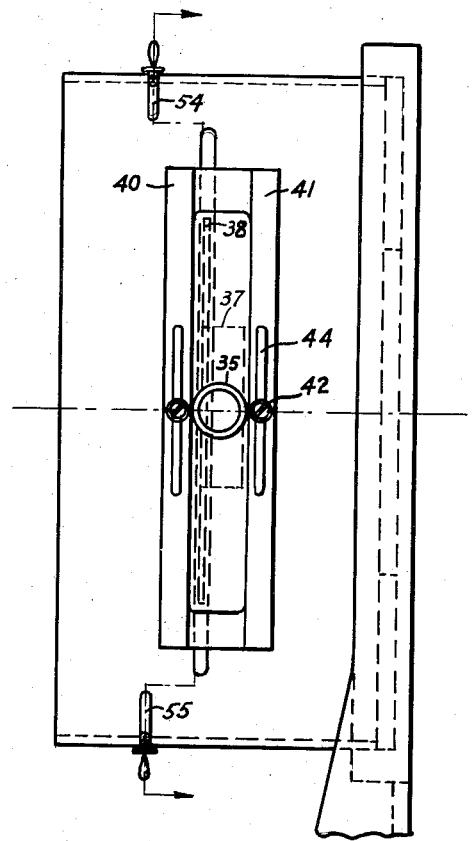

FIGS. 2 and 3, in front and side elevations, respectively, the former in cross section, show one of these projectors in greater detail.

Figure 5:
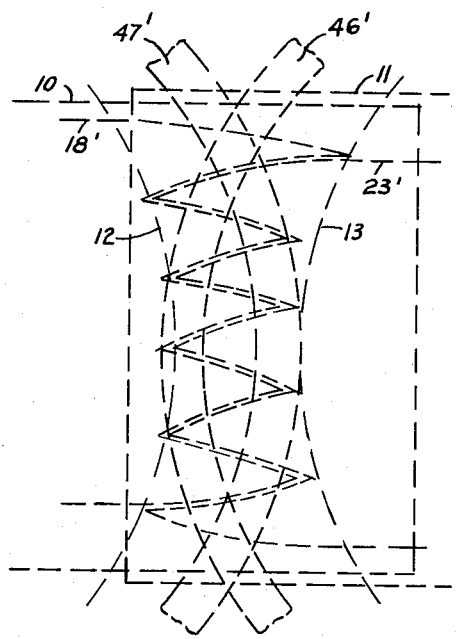
Figure 4:
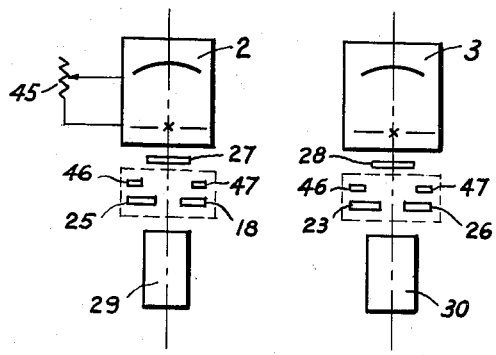

FIG. 4 illustrates a preferred physical arrangement of such projectors and FIG. 5 represents part of a background projection screen including the overlapping portions of adjacent beams together with some indication of the outlines of masks projected thereon.

In FIG. 1 a number of projectors 1, 2, 3, etc. are shown arranged to project a number of picture components in partial superimposition on background projection screen 4 from which the composite picture is taken by a photographic or television cameras 5, 6 arranged in front of screen 4, if necessary together with a live action (not shown).

The component pictures projected by projectors 1, 2, 3 etc. are at least partially overlapping resulting in superimpositions or overlap areas schematically indicated in FIG. 1 at 7, 8, 9 etc., and one, 7, being shown in elevation and schematically in FIG. 5.

These overlaps may be of approximately equal width such as exaggeratedly indicated in FIG. 5 by the areas approximately limited by straight dotted lines 10, 11 or of varying width on curved lines such as defined for examples by circles 12, 13.

As a result of these overlaps of identical picture portions, the intensity of light in strips 10, 11 will be increased.

At the same time, further, in view of the perpendicular direction of light beams 1, 2, 3, there will appear in cameras 5, 6, light inequalities or "hot" spots corresponding to the optical centers of light beams 1, 2, 3, etc., respectively, as schematically indicated in FIGS. 1 and 2 at 14, 15, 16, 17, etc., with the light intensity in each beam decreasing from hot spots 14 to 17, etc. toward the periphery of each beam.

The result is a marked unevenness in picture intensity which makes it difficult, if not impossible, to use straight i.e., non-agular projection photography or television of picture components. Angular projection, on the other hand, of such picture components while avoiding hot spots involves distortion and compensation of distortion of the transparencies used as picture components, and also results in light loss while still retaining some unevenness in light intensity values due to the angular incidence of light on the projection screen. The result is at least a compromise achieved at relatively high cost and with rather complex operations.

In accordance with the invention straight non-angular projection and the direct taking of overlapping picture components from a common screen is assured by providing in an unsharp zone of the projectors or projection beam overlaps, interleaving masks of the shape indicated in FIG. 2 at 18, preferably increasing in width from center portion 19 along the horizontal line center 20 of the array, as schematically indicated to upper and lower edge portions indicated at 21 and 22, respectively.

As apparent from FIG. 4, mask 18 arranged for example in projector 2 cooperates optically with another mask 23 of adjacent projector 3 in the following manner: The two masks 18, 23 are arranged in their respective projectors 2 and 3 so as to interleave optically with each other as apparent from FIG. 4, which shows the corresponding portion of background projection screen 4 of FIG. 1 where the approximate effects of masks 18 and 23 are indicated by dotted lines $18^1$, $23^1$, respectively.

As also apparent from FIG. 4, on the opposite side of projectors 2, 3, there are arranged other masks of the type shown in FIG. 2 at 18 and corresponding to the outline shown in FIG. 5 at $18^1$. These masks are indicated at FIG. 2 at 25, 26, respectively, and are arranged optically to interleave with each other in a manner similar to that illustrated in FIG. 5 by the outlines $18^1$ and $23^1$ produced by masks 18 and 23.

As apparent from FIG. 4 masks 18, 23, 25, 26 are arranged in unsharp zones of the projector beams, preferably between transparencies or slides 27, 28, representing the picture components concerned and objectives 29, 30 of projectors 2, 3, respectively. In order to adjust overall light intensity and the variation of light intensity over the overlap areas, masks 18, 23, 25 and 26 are arranged adjustable independently from each other in directions indicated in FIG. 2 at 31, 32, 33, 34, respectively, and preferably also in direction perpendicular to directions 31 to 34.

Movement in directions 31, 32 is caused by turning the knob 35 and thereby screw bolt 36 (see also FIG. 3), thus moving lead nut 37 and base plate 38 holding or forming mask 18.

Movement in directions 33, 34 is caused by moving box or casing 39, which supports screw bolt 36, as a whole. Casing 39 as apparent from FIG. 3, is provided with side flanges 40, 41 attached by screws 42 to the cylindrical projector housing or part 43. Flanges 40, 41 have longitudinal slots 44 permitting adjustment of casing 39 and mask 18 supported therein, in directions 33, 34 as indicated in FIG. 2.

Slots 44 are also of sufficient width to permit some adjustment in a direction perpendicular to the plane of directions 31 to 34, or in the direction of the optical axis of the projector, in this case projector 2.

Furthermore additionally, to increase adjustability, masks 18, 23, 25, 26 etc. may be made of semitransparent material or if desired of a material gradually varying in density preferably from its inner circular periphery decreasing in density to its outer zigzag periphery, the variation in density if necessary also occurring along circular lines coaxial with hot spots 14, 15, 16, 17, etc.

The multi-projector arrangement for back projection has the following advantage.

Since studio space behind the screen is limited and studio space is expensive, cost of projection is reduced.

It is not necessary anymore to project from the screen at an angle. The projectors are used straight, i.e., at an angle perpendicular to the projection surface.

Until now the taking angle in back projection had to be equal to the projection angle. The invention makes the taking more flexible and since freedom of movement of the camera or cameras in motion picture and TV production is very important, production is facilitated and accelerated. The invention permits use of back projection screen under widely varying conditions.

Furthermore until now in photographing the projectors through the screen the hot spots became at least sometimes noticeable and it was necessary to remove it by providing arranged in front of the projector a glass with a relatively dark center portion. Such dark portion, however, until now was only adjusted for the camera at a perpendicular angle of operating position. At varying angles the position of this dark spot had to be continuously readjusted. It also had to be enlarged or reduced in size in order to cover the light source for oblique taking angles.

In addition to these hot spots there also occurred fall-off zones, i.e., the light became gradually darker toward the periphery of the beam increasing in circles around the hot spot so that on the corners of a quadrangular projection section the dark portions increased.

In accordance with the invention, the projectors are arranged with their beams overlapping along the zones of darkness as apparent from FIG. 4.

These zones or strips of darkness therfore will receive twice the light, i.e., the light of two projectors and at these points therefore there will be light exceeding the decrease in light over the fall-off zone.

In accordance with the invention, the masks are arranged in an unsharp zone of the projector beam on each side of the overlap onto the adjacent projector beam, and preferably shaped approximately along a circle of the projector beam associated therewith.

The two masks $18^1$, $23^1$ of adjacent projectors interleave optically as apparent from the outlines 18, 23 from the corresponding outlines schematically indicated in FIG. 5. When these two masks are completely closed, i.e., fully supplementing to each other, at least to some extent, double projection of light will take place on the projection surface because at this point on each side, half of the light is shut off, i.e., the fall-off zone exists again.

In order to avoid such fall-off, in accordance with the invention, adjacent projectors are provided with supplementing masks 18, 23 spaced to produce outlines such as illustrated in FIG. 5 by shapes $18^1$, $23^1$.

As a result, the light of the two projectors can be practically completely equalized and the camera moved at will in each direction in front of the back ground screen.

In case, however, for some reason or other, a separation line is still noticeable between adjacent component pictures, homogeneity of light distribution and compensation of projectors can be further enhanced by changing the light intensity of each projector additionally by inserting a resistance 45 in series with the light source.

As another modification of the invention, in addition to a zigzag mask such as shown in FIG. 2 at 18, and in FIG. 4, at 18, 23, 25, 26, there is also arranged in the unsharp zone, preferably between slides 27, 28 and masks 18, 25, or 23, 26, respectively, additional straight line or curved masks such as indicated in FIG. 4 at 46, 47, and in greater detail in FIG. 2 at 47, the corresponding shapes in FIG. 5 being shown at 46, 47, respectively, in order to extinguish at least part of the outlines of zigzag masks 18, 23 so as to further reduce separation lines or shades between adjacent picture components. This especially applies in case illumination of the adjacent projectors is not completely equalized.

This additional mask adjustment is easily operable and especially important for productions of long duration because projector lights especially in TV studios are subject to change and it is difficult if not impossible to adjust them during production.

These straight-line masks 46, 47 can also be arranged in front of the projection lens and may be adjustable as apparent from FIG. 2, sidewise in independent direction 48, 49, and 50, 51 by means of screw clamps slidingly attached in slots of projector housing 43. This also should permit adjustment in direction of the axis projector housing 43.

As a further modification of the invention, it is provided to arrange if necessary between two adjacent projectors an additional projector such as indicated in FIG. 1 at 56 projecting an additional picture coinciding with the corresponding picture parts of adjacent projectors 3 and 57. Additional projector 56 serves to increase at this point the intensity of that particular picture portion. Projector 56 may also be provided if necessary with masks of the type indicated in FIGS. 2 and 3 at 19, and in FIG. 4 at 18, 23, 25, 26, all adjustable in any way appropriate for the invention.

Additional projector 56 is especially important in color productions which require much more light than black and white, and thereby will dispense with large and long distance circle lights and thus further reduce space requirements in a studio.

A preferred example of mask outline consists of arcs adjoining each other angularly in the manner of a heralding pattern as applied at an enlarged scale in FIG. 4 which also shows the interleaving of two masks cooperating with adjoining beam edges but adjustable independently from each other.

Further in accordance with another modification, the mask may be made semitransparent or of a varying transparency, preferably varying in density horizontally or radially i.e., in a direction toward the center of a component picture.

As a result not only the inequality of high intensity spot light sources such as indicated in FIG. 1 will be compensated and hot spots avoided, even in direct or "straight" projection and taking, but at the same time, inequality in light due to the overlaps will be compensated and easily adjusted.

The invention is not limited to the arrangement of projectors, screens, masks, nor to the shape and form of the various elements shown and described but may be applied in any form or manner whatsoever without departing from the scope of this disclosure.

I claim:

1. In a projection system, a projection screen, at least two projectors each having an objective and a light source and both arranged side by side with their optical axis perpendicular to said screen for producing light beams intersecting each other at a portion of their peripheries thereby producing adjacent pictures on said screen having overlapping edge portions, each of said projectors having at least one mask arranged in front of the picture in an unsharp zone of each of said light beams located prior to said intersections; each of said masks having a zigzag outline traversing said peripheral portions and being so arranged as to reduce the intensity of the light falling on said screen with increasing distance from the optical axis of the light beam associated with said mask, the two adjacent masks of adjacent projectors being of substantially identical shape but longitudinally displaced with respect to each other so as to produce on said overlapping edge portions of adjacent pictures an interleaving pattern permitting passage of light between their respective outlines, said masks being adjustable substantially independent from each other, and additional masking means having substantially smooth edges extending in the general direction of said outline and arranged to be superimposed optically at least upon a portion of said first masking means.

2. System according to claim 1 wherein said additional masking means extends substantially parallel to the general direction of said first masking means.

References Cited in the file of this patent

UNITED STATES PATENTS

| 545,423 | Chase | Aug. 27, 1895 |
| 1,151,221 | Schwanhausser | Aug. 24, 1915 |
| 1,863,078 | Woodland | June 14, 1932 |
| 2,240,398 | Huitt | Apr. 29, 1941 |
| 2,319,204 | Bolsey | May 18, 1943 |
| 2,421,746 | Duffy | June 18, 1947 |
| 2,610,544 | Waller et al. | Sept. 16, 1952 |
| 2,920,526 | Shearer | Jan. 12, 1960 |

FOREIGN PATENTS

| 186,993 | Great Britain | Oct. 9, 1922 |